(12) United States Patent
Watanabe (10) Patent No.: US 6,272,280 B1
(45) Date of Patent: Aug. 7, 2001

(54) APPARATUS FOR REPRODUCING IMAGE DATA FROM A TAPE-SHAPED RECORDING MEDIUM

(75) Inventor: Yoshiyuki Watanabe, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/182,007

(22) Filed: Oct. 29, 1998

(30) Foreign Application Priority Data

Nov. 7, 1997 (JP) ...................................... 9-305741

(51) Int. Cl.[7] ...................................... H04N 5/91
(52) U.S. Cl. .................. 386/67; 386/68; 386/81
(58) Field of Search ................ 386/46, 95, 121, 386/68, 80, 67, 51, 81; H04N 5/783

(56) References Cited

U.S. PATENT DOCUMENTS

| | | | |
|---|---|---|---|
| 5,513,010 | * 4/1996 | Kori et al. | 386/121 |
| 5,589,943 | * 12/1996 | Kozuki et al. | 386/121 |
| 5,712,947 | * 1/1998 | Oguro et al. | 386/95 |
| 5,838,513 | * 11/1998 | Lee | 386/51 |

* cited by examiner

Primary Examiner—Huy Nguyen
(74) Attorney, Agent, or Firm—Fitzpatrick, Cella, Harper & Scinto (57) ABSTRACT

A reproduction apparatus reproduces image data recorded in a plurality of recording modes with different tape feeding speeds from a tape-like recording medium. In this apparatus, in a search mode of searching for still image data by feeding the tape-like recording medium at a high speed, the recording mode of the still image data is discriminated, and the still image data is then reproduced.

17 Claims, 5 Drawing Sheets

APPARATUS FOR REPRODUCING IMAGE DATA FROM A TAPE-SHAPED RECORDING MEDIUM

BACKGROUND OF THE INVENTION

1. Field of the Invention

The present invention relates to a reproduction apparatus and, more particularly, to an apparatus for reproducing image data from a tape-like recording medium on which still image data and motion image data have already been recorded in a plurality of modes in which different tape feeding speeds are set for recording operation.

2. Related Background Art

As an apparatus of this type, a digital VTR for recording an image signal as a digital signal on a magnetic tape has been known. A proposal for the format (DV standards) of consumer digital VTRs has recently been made in the HD digital VCR conference.

According to the DV standards, a motion image signal can be recorded on a tape, together with a still image signal of a predetermined period of time. An ID signal called PPID (picture/photo ID) is recorded for five seconds on a recording portion for a still image signal to help search for the still image data.

In addition, according to the DV standards, two recording modes with different tape feeding speeds are prepared, namely an SP mode of recording/reproducing a digital signal on a tape by feeding the tape at 18 mm/s, which is a standard speed, and an LP mode of recording/reproducing a digital signal on the tape by feeding the tape at 12 mm/s, which is lower than the standard speed. In the DV standards, mode data indicating the modes used in recording operation are recorded on predetermined areas of many helical tracks formed on the tape.

As described above, since the SP and LP modes are prepared in the DV standards, still image data may be recorded/reproduced in both the SP and LP modes. When still image signals recorded in the SP and LP modes in this manner are to be reproduced upon search, data must be reproduced in the modes corresponding to the modes set in the recording operation.

As described earlier, however, a PPID is recorded only for five seconds, and the tape is fed at a speed higher than that in recording operation when a search for a still image signal (to be referred to as a photo-search hereinafter) is performed by using the PPID. The interval during which the PPID can be detected is shortened very much.

In addition, since a PPID and mode data are recorded on separate areas on each track, when the tape is fed at a high speed as in photo-search operation, it is difficult to detect both the PPID and the mode data in a good state.

It is therefore very difficult to realize an easy photo-search by detecting mode data and determining a reproduction mode upon detecting a PPID within a limited time.

Such a problem also arises when specific signals recorded on a tape in a plurality of modes with different tape feeding speeds are to be searched out by feeding the tape at a high speed.

SUMMARY OF THE INVENTION

It is an object of the present invention to solve the above problems.

It is another object of the present invention to allow an easy search for still image signals even if they are recorded in a plurality of recording modes.

It is still another object of the present invention to allow a quick search for a predetermined image signal recorded on a recording medium.

In order to achieve the above objects, according an aspect of the present invention, there is provided an apparatus for reproducing image data from a tape-like recording medium on which motion image data and still image data are recorded, the image data being recorded in a first recording mode of recording the image data by feeding the tape-like recording medium at a first speed and in a second recording mode of reproducing the image data by feeding the tape-like recording medium at a second speed, comprising feeding means for feeding the tape-like recording medium, reproduction means for reproducing digital data including the image data from the tape-like recording medium, and control means for controlling feeding operation of the feeding means and reproducing operation of the reproduction means, the control means controlling the feeding means and the reproduction means such that after a recording mode of the still image data is determined in a still image search mode of searching for the still image data by reproducing the digital data while feeding the tape-like recording medium at a high speed, the still image data is reproduced by feeding the tape-like recording medium at a speed corresponding to the determined recording mode.

The above and other objects, features, and advantages of the present invention will be apparent from the following detailed description in conjunction with the accompanying drawings and the appended claims.

DETAILED DESCRIPTION OF THE PREFERRED EMBODIMENT

An embodiment of the present invention will be described below.

In this embodiment, the present invention is applied to a digital VTR complying with the above DV format. A track format formed on a tape by this VTR of this embodiment will be described first.

Figure 4:
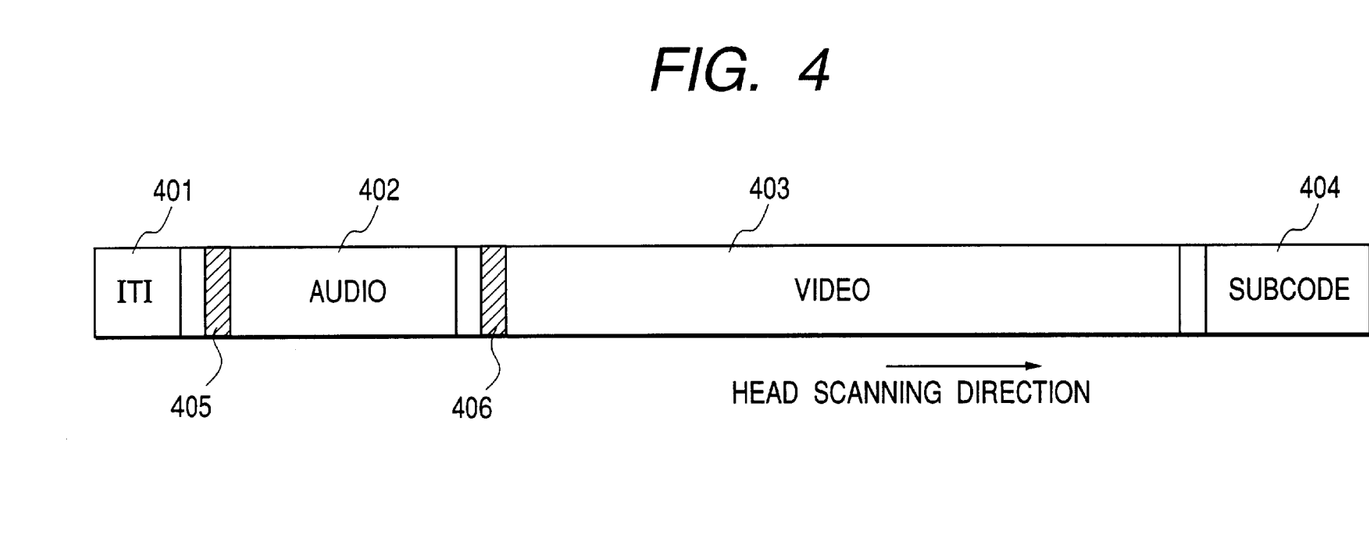
FIG. 4 is a view showing the format of data reproduced by the apparatus in FIG. 1.

FIG. 4 is a view showing the format of one track formed on a tape by the VTR of this embodiment. Referring to FIG. 4, each track includes an ITI area 401, an audio area 402, a video area 403, and a subcode area 404 in this order in the head scanning direction. On each of the audio, video, and subcode areas shown in FIG. 4, data consisting of a plurality of sync blocks is recorded. The above data indicating a recording mode is recorded on first two sync blocks (to be referred to as pre-syncs hereinafter) 405 in the audio area 402 and a pre-sync 406 in the video area 403.

Figure 5:
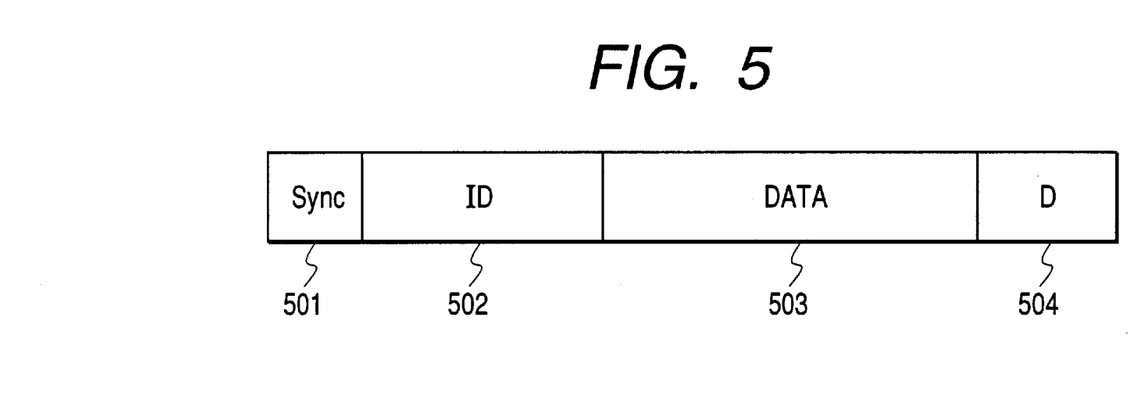
FIG. 5 is a view showing the format of data reproduced by the apparatus in FIG. 1.

FIG. 5 is a view showing the state of each sync block in a subcode area.

Each sync block of the subcode has sync data 501, ID data 502, subcode data 503, and a data parity 504 in the order named from the head of the block. The above PPID is recorded on the ID 502 of the sync block in the subcode area 404.

Recording of the above still image signal and PPID will be described next.

In general, a still image signal like the one described above is recorded for a period of time longer than five seconds, e.g., six seconds, to allow a search using a PPID. Recording methods for such still image recording can be roughly classified into two methods:

1. a method of recording a PPID for five seconds, together with a still image signal, first, and then continuously recording an identical still image signal on the video area for about one second; and
2. a method of recording a still image signal on a video area for about one second first, and then continuously recording a PPID and a still image signal for five seconds.

Figure 6:
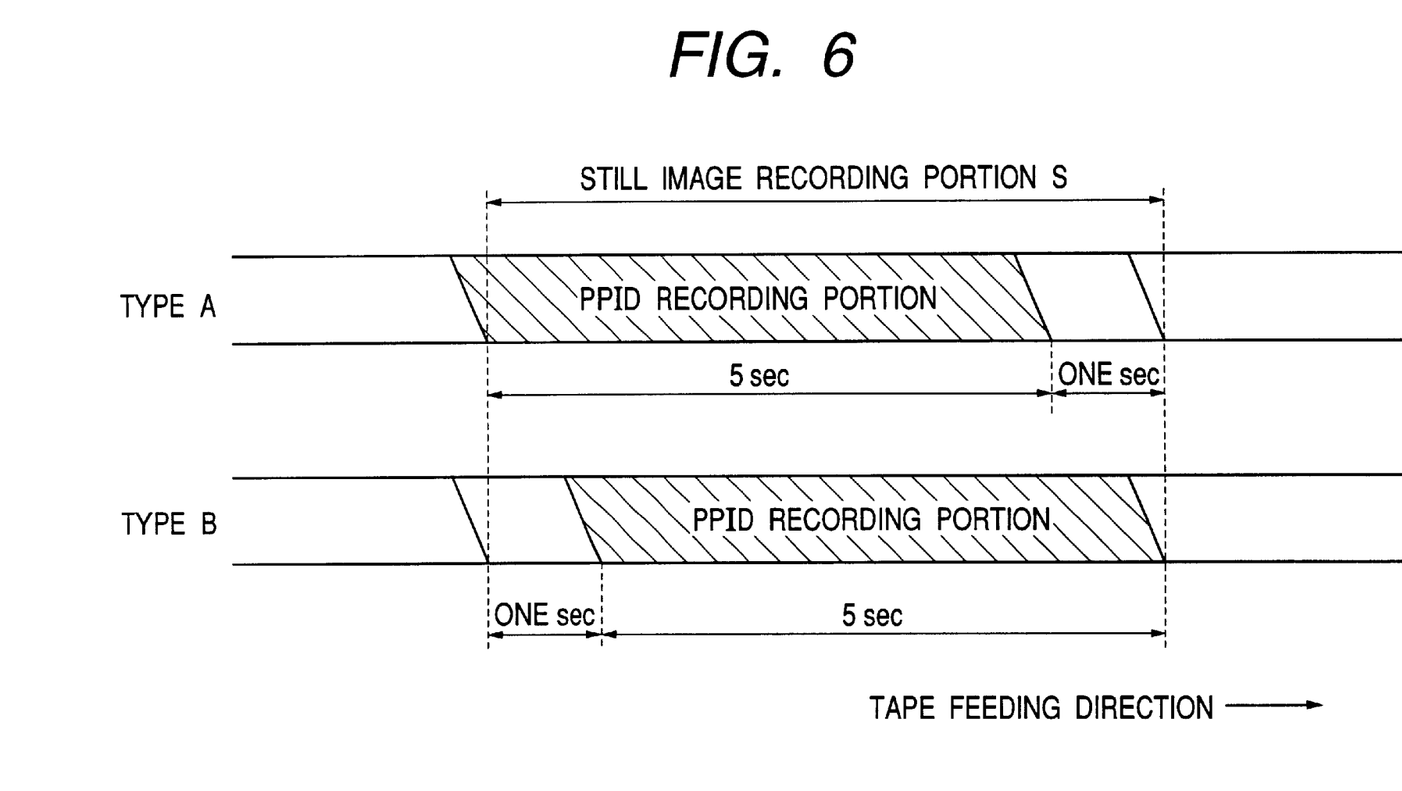
FIG. 6 is a view showing how still image data to be reproduced by the apparatus in FIG. 1 is recorded.

As shown in FIG. 6, on a still image recording portion S (to be referred to as type A hereinafter) recorded on a tape 101, which is recorded by method 1, a PPID is recorded for five seconds on the leading side of the still image signal recording portion of about six seconds. On a still image recording portion S (to be referred to as type B hereinafter) recorded by method 2, a PPID is recorded for five seconds on the trailing side of the still image signal recording portion. Assume that in the following embodiment, still image data is recorded as type A on the tape 101.

A digital VTR to which the present invention is applied will be described next.

Figure 1:
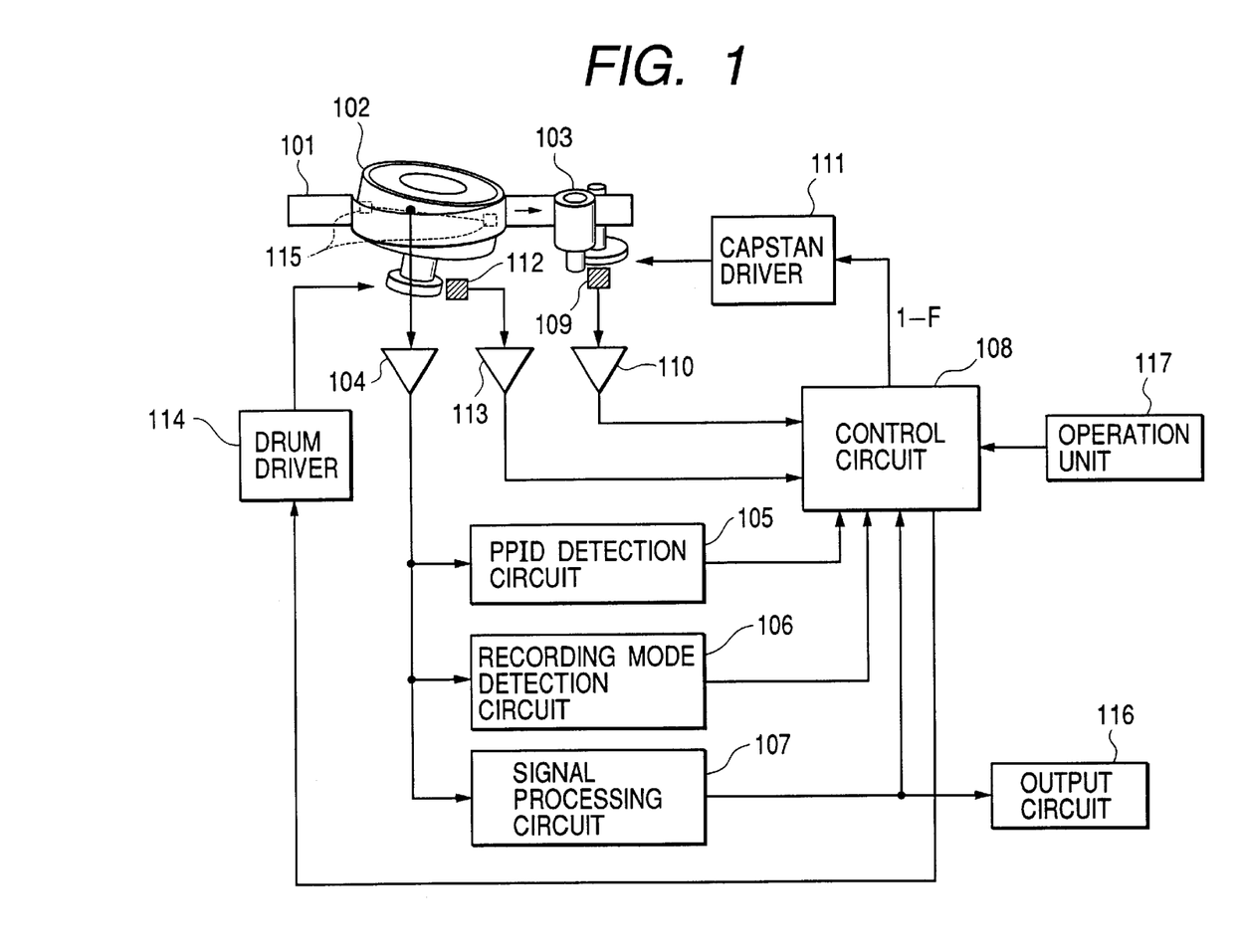
FIG. 1 is a block diagram showing the arrangement of a digital VTR to which the present invention is applied.

FIG. 1 shows the arrangement of the reproduction system of the digital VTR to which the present invention is applied.

Referring to FIG. 1, a drum cylinder 102 has a head 115 for recording/reproducing audio and image signals on/from the magnetic tape 101. A capstan 103 feeds the magnetic tape 101. A reproduction amplifier 104 amplifies a reproduction output from the recording/reproducing head 115. A PPID detection circuit 105 receives the reproduction data amplified by the reproduction amplifier 104, detects a PPID, and generates a 1-bit logic signal representing the presence/absence of the PPID. A recording mode detection circuit 106 receives the reproduction data and detects the above mode data to generate a 1-bit logic signal representing the SP or LP mode. A signal processing circuit 107 receives the reproduction data, decodes the image signal, and decompresses the information. In addition, the signal processing circuit 107 outputs frame pulses to a control circuit 108 in synchronism with the frame period of the output image.

The control circuit 108 controls the overall system in this embodiment. An MR element 109 generates an FG (Frequency Generator) signal indicating a rotational frequency from a magnet magnetized around the capstan. A CFG amplifier 110 generates a rectangular signal (to be referred to as a CFG) representing a rotational frequency by amplifying/shaping the FG signal generated by the MR element 109. A capstan driver 111 receives the capstan control signal generated by the control circuit 108 and drives the capstan 103. A pickup 112 generates an FG signal representing the rotational speed of the drum cylinder 102. A DFG amplifier 113 generates a rectangular signal (to be referred to as a DFG hereinafter) representing the rotational frequency of the drum cylinder by amplifying/shaping the FG signal generated by the pickup 112. A drum driver 114 receives the drum motor control signal generated by the control circuit 108 and rotates/drives the drum cylinder 102.

A head 115 records/reproduces data on the magnetic tape 101 in the manner described above. An output circuit 116 converts the image/audio signal obtained by the signal processing circuit 107 into a signal in a form suitable for an output device such as an external monitor. An operation unit 117 has a plurality of switches for designating recording/reproducing operation, a photo-search (to be described later), and the like.

Operation for a photo-search in this arrangement will be described.

Figure 3:
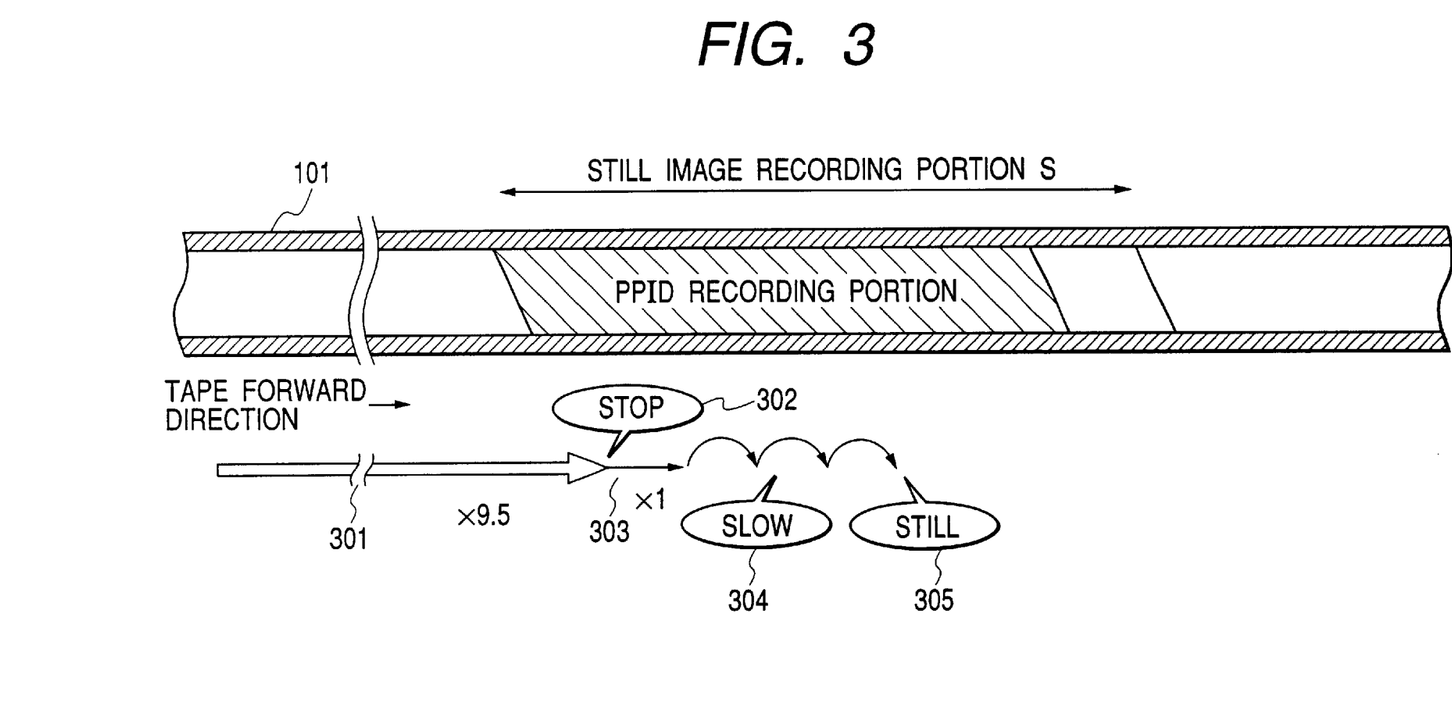
FIG. 3 is a view for explaining tape feeding operation of the apparatus in FIG. 1 in still image data search operation.

FIG. 3 is a view for explaining a procedure for a photo-search.

Referring to FIG. 3, as described above, in this embodiment, the PPID is recorded on the still image recording portion S on the tape 101 for five seconds from the head of the portion S.

Upon receiving a photo-search command from the operation unit 117, the control circuit 108 starts the drum cylinder 102 through the head 115. After the rotation of the drum cylinder 102 becomes stable, the control circuit 108 controls to make the capstan driver 111 start the capstan 103. In this embodiment, in photo-search operation, a search for still image data is performed by feeding the tape 101 at a high speed 9.5 times higher than the tape feeding speed in normal reproduction operation in the SP mode.

In a state 301 wherein the capstan stabilizes at a feeding speed 9.5 times higher than the rotational speed of the capstan, the control circuit 108 checks logic signals from the PPID detection circuit 105 and the recording mode detection circuit 106. When the tape position comes to the recording position of the still image data in this state, the logic signal from the PPID detection circuit 105 changes from a state indicating the absence of a PPID to a state indicating the presence of a PPID.

When the logic signal from the PPID detection circuit 105 changes from the state indicating the absence of a PPID to the state indicating the presence of a PPID, the control circuit 108 immediately stops the capstan 103 from feeding the tape 101. Thereafter, the tape 101 is fed at a normal speed again (as will be described later, at this time, the tape feeding speed has already been set to a speed corresponding to the recording mode of the still image data) to be fed by a slight distance corresponding to several frames. After this operation, slow reproduction 304 is performed by intermittent driving to reliably obtain still image data, and tape feeding is stopped. The operation mode then shifts to a still reproduction mode 305.

In this case, normal-speed reproduction 303 is performed to adjust the stopping position of the tape in the intermittent slow reproduction 304 to be performed afterward. After the capstan 103 is started, its rotation must be immediately stopped. This is because, if the tape traveling distance becomes long, the tape position set when the operation mode finally shifts to the still reproduction 305 passes through the still image recording portion.

In this case, in order to quickly obtain a good still image without any error in reproduction data, it is very important to set the tape feeding speed to speeds corresponding to the detected recording modes of still image data in the normal-speed reproduction 303, the intermittent slow reproduction 304, and the still reproduction 305.

In this embodiment, therefore, the recording mode is detected within the range of a still image recording portion. Mode detection in a photo-search will be described with reference to the timing chart of FIG. 2.

Figure 2:
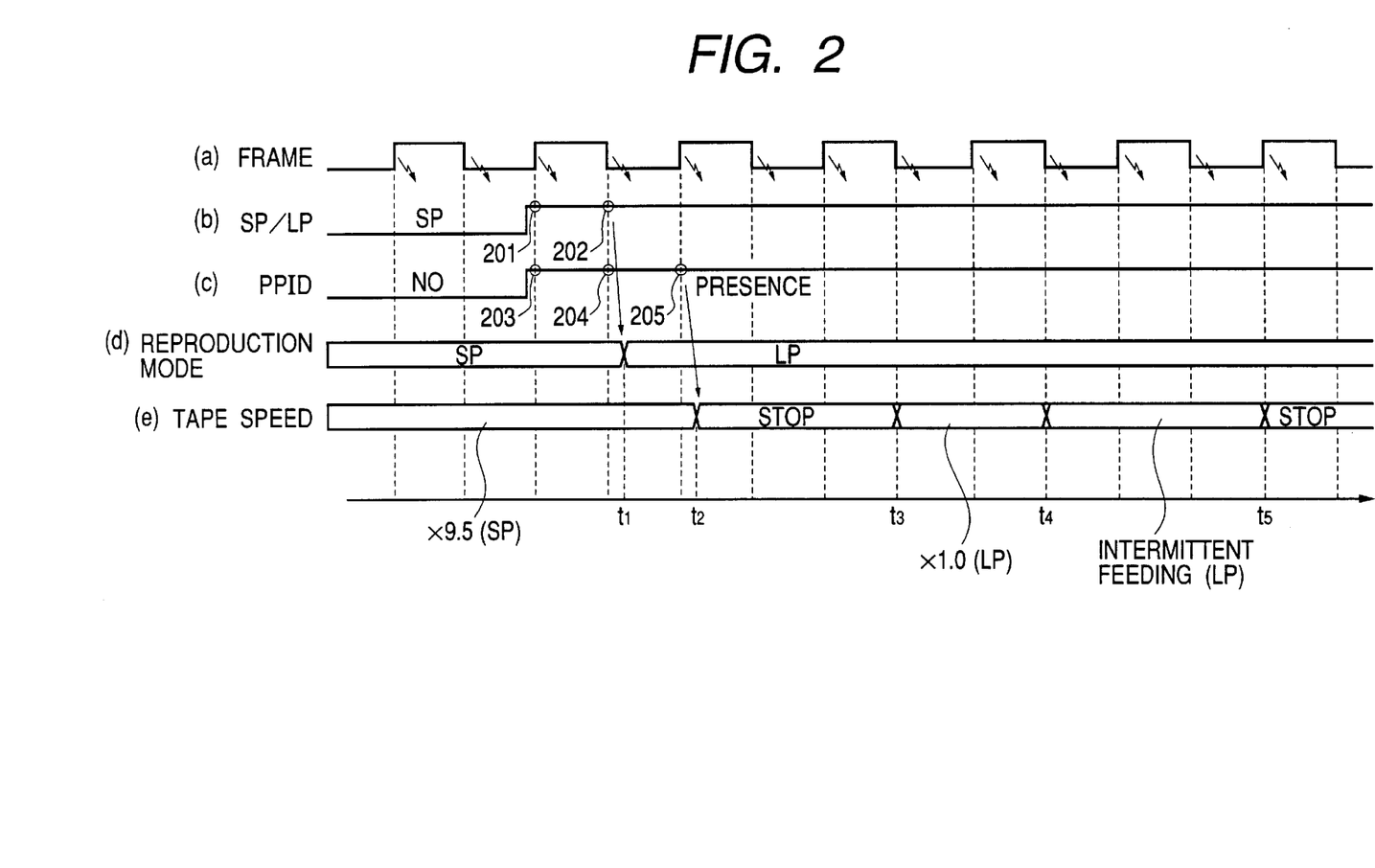
FIG. 2 is a timing chart for explaining still image data search operation of the apparatus in FIG. 1.

The timing chart in FIG. 2 shows the control timing of each component of the apparatus in a case wherein the tape position shifts from a recording area on which motion image data is recorded in the SP mode to a recording area on which still image data is recorded in the LP mode in a photo-search in the embodiment described above.

Referring to FIG. 2, (a), (b), and (c) respectively indicate the states of output signals from the signal processing circuit 107, the recording mode detection circuit 106, and the PPID detection circuit 105, and (d) indicates the reproduction modes set in the control circuit 108. Tape feeding speeds as target control values in normal-speed reproduction and intermittent slow reproduction differ depending on the modes. In addition, (e) indicates the feeding speed of the tape 101 actually fed by the capstan 103.

The control circuit 108 discriminates the mode by means of software processing using a microprocessor. In the normal reproduction mode, the control circuit 108 discriminates the mode using signals from the recording mode detection circuit 106 by generating an interruption once every a plurality of frame intervals (e.g., several ten frames). In photo-search operation, as indicated by the arrows in (a) in FIG. 2, the control circuit 108 discriminates an output signal from the signal processing circuit 107 every time a frame pulse is input from the signal processing circuit 107, i.e., every time a frame interruption is generated.

Interruption processing for a PPID is also performed for every frame pulse. When the tape position shifts from a motion image recording area to a still image recording area during a photo-search, a logic signal from the PPID detection circuit 105 changes from the state indicating the absence of a PPID to the state indicating the presence of a PPID.

As described above, the control circuit 108 checks these signals at the edge of each frame pulse. To prevent a discrimination error, the control circuit 108 confirms the reproduction mode and a PPID when the states of the respective logic signals consecutively coincide with each other a plurality of number of times.

In this case, according to this embodiment, the recording mode is confirmed when the states of the logic signals coincide with each other twice consecutively, whereas a PPID is confirmed when they coincide with each other three times consecutively.

When the control circuit 108 determines that the states of the logic signals from the recording mode detection circuit 106 coincide with each other twice at time points 201 and 202, the control circuit 108 switches the reproduction mode from the SP mode to the LP mode (t1). When the control circuit 108 determines that the states of the logic signals from the PPID detection circuit 105 coincide with each other consecutively three times at time points 203, 204, and 205, the control circuit 108 determines a still image recording area and stops feeding the tape 101 (t2). After feeding of the tape is stopped for a 3-frame interval (t3), the control circuit 108 feeds the tape at the normal reproduction speed in the determined reproduction mode, the LP mode in this case, for a 2-frame interval (t4). After the tape is intermittently fed for an interval corresponding to several frames, the control circuit 108 stops feeding the tape (t5).

In this case, the numbers of times of checking coincidence are set such that the recording mode is discriminated before a PPID is detected. This setting is very important for a photo-search.

If a PPID is detected first, the flow of processing shifts to the next operation without accurately detecting the reproduction mode of still image data. As a result, the tape 101 is fed at a speed corresponding to a wrong reproduction mode in a series of operations in FIG. 3, i.e., normal-speed reproduction 303→intermittent slow reproduction 304→still reproduction 305. If the tape is not fed at a speed corresponding to the correct reproduction mode, i.e., the same mode as that in recording operation, the head cannot properly trace tracks on the tape, resulting in a large number of errors in reproduction data. Consequently, the reproduced image has a poor quality.

In this embodiment, therefore, the recording mode is determined when the states of logic signals from the recording mode detection circuit 106 coincide with each other twice consecutively. As for a PPID, a still image signal recording portion is determined when the states of logic signals from the PPID detection circuit 105 coincide with each other three times consecutively. With this setting, a proper reproduction mode can always be set at a stop time 302 in FIG. 3.

After this operation, therefore, the tape feeding speed becomes a feeding speed based on the correct reproduction mode, and occurrence of an error in reproduction data can be prevented.

As described previously, in this embodiment, in the still image search mode of searching for still image data, the recording mode of the still image data is discriminated before the still image data is discriminated. Therefore, the tape can be fed at a speed based on the correct recording mode immediately after the still image data is detected.

This can consequently reduce disturbances on the screen when the tape speeds are switched in still image search operation.

In addition, according to this embodiment, since the periods at which recording mode discrimination is performed in still image search operation are set to be shorter than those in the normal reproduction mode, a change in recording mode can be quickly detected even when image data is reproduced while the tape is fed at a high speed. In addition, the interruption load on the microprocessor in the normal reproduction mode can be reduced.

In the above embodiment, still image data is detected by confirming coincidence of PPIDs three times, and the recording mode is discriminated by confirming coincidence of mode data twice. However, other settings can be made as long as the recording mode is discriminated before still image data is detected, i.e., the number of times of coincidence of mode data is set to be smaller than that of coincidence of PPIDs.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for reproducing image data from a tape-like recording medium on which motion image data and still image data are recorded, the image data being recorded in a first recording mode of recording the image data by feeding the tape-like recording medium at a first speed and in a second recording mode of reproducing the data by feeding the tape-like recording medium at a second speed different from the first speed, comprising:

feeding means for feeding the tape-like recording medium;

reproduction means for reproducing digital data including the image data from the tape-like recording medium; and control means for discriminating a recording mode of the image data and controlling feeding operation of said feeding means and reproducing operation of said reproduction means, said control means, in a still image search mode of searching for the still image data by reproducing the digital data while feeding the tape-like recording medium at a high speed, determining whether the recording mode of the still image data is the first recording mode or the second recording mode while feeding a still image recording area of the tape-like recording medium at the high speed and, after determining the recording mode of the still image data, controlling said feeding means and said reproducing means so as to start reproducing the searched still image data by feeding the tape-like recording medium at a speed corresponding to the determined recording mode.

2. An apparatus according to claim 1, wherein the digital data includes ID data indicating a recording area for the still image data and mode data indicating the recording mode of the image data.

3. An apparatus according to claim 2, wherein said control means detects the ID data and the mode data from the digital data reproduced by said reproduction means, and controls said reproduction means and said feeding means on the basis of the detected ID data and mode data.

4. An apparatus according to claim 3, wherein after said control means discriminates n times (n is an integer not less than two) whether states of the detected ID data coincide with each other, said control means determines the still image recording area in accordance with the discrimination result.

5. An apparatus according to claim 4, wherein after said control means discriminates m times (m is an integer not less than one and n>m) whether states of the detected mode data coincide with each other, said control means determines a recording mode of the still image data in accordance with the discrimination result.

6. An apparatus according to claim 3, wherein the ID data and the mode data are recorded on different areas of many helical tracks formed on the tape-like recording medium.

7. An apparatus according to claim 1, wherein said control means determines the recording mode and searches for the still image by software processing using a microprocessor.

8. An apparatus according to claim 7, wherein said control means determines the recording mode by interrupt processing with respect to said microprocessor.

9. A reproduction apparatus for reproducing image data recorded in a plurality of recording modes with different tape feeding speeds from a tape-like recording medium, wherein in a search mode of searching for predetermined image data by reproducing the digital data while feeding the tape-like recording medium at a high speed, said apparatus determines a recording mode of the predetermined image data from among a plurality of recording modes while feeding a recording area of the predetermined image data of the tape-like recording medium at the high speed and, after determining the recording mode of the predetermined image data, starts reproducing the searched predetermined image data by feeding the tape-like recording medium at a speed corresponding to the determined recording mode.

10. An apparatus according to claim 9, wherein ID data indicating a recording area for the predetermined image data and mode data indicating the recording mode are recorded on the tape-like recording medium, the recording mode is discriminated on the basis of the reproduced mode data, and the predetermined image data is searched out on the basis of the reproduced ID data.

11. An apparatus according to claim 10, wherein after it is discriminated n times (n is an integer not less than two) whether states of the ID data coincide with each other, the recording area for the predetermined image data is determined on the basis of the discrimination result, and after it is discriminated m times (m is an integer not less than 1 and n>m) whether states of the mode data coincide with each other, the recording mode is discriminated on the basis of the discrimination result.

12. An apparatus according to claim 10, wherein the ID data and the mode data are recorded on different areas of many helical tracks formed on the tape-like recording medium.

13. A reproduction method of reproducing image data recorded in a plurality of recording modes with different tape feeding speeds from a tape-like recording medium, wherein in a search mode of searching for predetermined image data by reproducing the digital data while feeding the tape-like recording medium at a high speed, said method includes a step of determining a recording mode of the predetermined image data from among a plurality of recording modes while feeding a recording area of the predetermined image data of the tape-like recording medium at the high speed and, after determining the recording mode of the predetermined image data, starting reproducing the searched predetermined image data by feeding the tape-like recording medium at a speed corresponding to the determined recording mode.

14. A method according to claim 13, wherein ID data indicating a recording area for the predetermined image data and mode data indicating the recording mode are recorded on the tape-like recording medium, the recording mode is discriminated on the basis of the reproduced mode data, and the predetermined image data is searched out on the basis of the reproduced ID data.

15. A method according to claim 14, wherein after it is discriminated n times (n is an integer not less than two) whether states of the ID data coincide with each other, the recording area for the predetermined image data is determined on the basis of the discrimination result, and after it is discriminated m times (m is an integer not less than 1 and n>m) whether states of the mode data coincide with each other, the recording mode is discriminated on the basis of the discrimination result.

16. A method according to claim 14, wherein the ID data and the mode data are recorded on different areas of many helical tracks formed on the tape-like recording medium.

17. A reproducing apparatus for reproducing image data from a tape-like recording medium, the image data being recorded in a first recording mode of recording the image data by feeding the tape-like recording medium at a first speed and in a second recording mode of recording the image data by feeding the tape-like recording medium at a second speed different from the first speed, comprising:

feeding means for feeding the tape-like recording medium;

reproduction means for reproducing digital data including the image data from the tape-like recording medium; and determining means for determining whether a recording mode of the image data reproduced by said reproduction means is the first recording mode or the second recording mode by interrupt processing of a microprocessor; and mode setting means for setting a mode of said apparatus between a plurality of modes including a normal reproduction mode in which said feeding means feeds the tape-like recording medium at a normal speed corresponding to the determined recording mode and the microprocessor performs the interrupt processing for a determining operation of the recording mode at a first interrupt interval, and a search reproduction mode in which said feeding means feeds the tape-like recording medium at a speed faster than the normal speed and the microprocessor performs the interrupt processing for the determining operation at a second interrupt interval shorter than the first interrupt interval.

* * * * *

UNITED STATES PATENT AND TRADEMARK OFFICE
CERTIFICATE OF CORRECTION

PATENT NO.   : 6,272,280 B1
DATED        : August 7, 2001
INVENTOR(S)  : Yoshiyuki Watanabe It is certified that error appears in the above-identified patent and that said Letters Patent is hereby corrected as shown below:

Title page,
Insert after [*] Notice -- This patent issued on a continued prosecution application filed under 37 CFR 1.53(d). and is subject to the twenty year patent term provisions of 35 U.S.C. 154(a)(2). --

Column 2,
Line 4, "an" should read -- to an --.

Column 8,
Line 65 should be deleted.

Signed and Sealed this

Eleventh Day of March, 2003

JAMES E. ROGAN
*Director of the United States Patent and Trademark Office*